United States Patent
Schuecker et al.

(10) Patent No.: US 8,465,626 B2
(45) Date of Patent: Jun. 18, 2013

(54) COKE OVEN WITH OPTIMIZED CONTROL AND METHOD OF CONTROL

(75) Inventors: Franz-Josef Schuecker, Castrop-Rauxel (DE); Ronald Kim, Essen (DE)

(73) Assignee: Uhde GmbH, Dortmund (DE)

( * ) Notice: Subject to any disclaimer, the term of this patent is extended or adjusted under 35 U.S.C. 154(b) by 510 days.

(21) Appl. No.: 12/087,209

(22) PCT Filed: Oct. 11, 2006

(86) PCT No.: PCT/EP2006/009800
§ 371 (c)(1),
(2), (4) Date: Oct. 14, 2008

(87) PCT Pub. No.: WO2007/087839
PCT Pub. Date: Aug. 9, 2007

(65) Prior Publication Data
US 2009/0032382 A1 Feb. 5, 2009

(30) Foreign Application Priority Data
Jan. 31, 2006 (DE) .......................... 10 2006 004 669

(51) Int. Cl.
*C10B 15/02* (2006.01)
*C10B 21/10* (2006.01)

(52) U.S. Cl.
USPC ................... 201/1; 201/15; 201/27; 202/135; 202/151

(58) Field of Classification Search
USPC .............. 201/1, 15, 27, 36, 41; 202/135, 151, 202/108, 121, 149, 248; 431/12, 76
See application file for complete search history.

(56) References Cited

U.S. PATENT DOCUMENTS

| | | | |
|---|---|---|---|
| 4,287,024 A | 9/1981 | Thompson | |
| 4,344,820 A | 8/1982 | Thompson | |
| 5,114,542 A | 5/1992 | Childress et al. | |
| 5,318,671 A | 6/1994 | Pruitt | |
| 5,928,476 A | 7/1999 | Daniels | |
| 2010/0025217 A1* | 2/2010 | Schuecker et al. .............. 201/15 | |

FOREIGN PATENT DOCUMENTS

| | | |
|---|---|---|
| CA | 2 052 177 C | 3/1992 |
| DE | 102005055483 A1 | 5/2007 |
| GB | 1 555 400 | 11/1979 |

OTHER PUBLICATIONS

Buss, Walter E. et al.; "Thyssen Still Otto/PACTI nonrecovery cokemaking system"; Iron and Steel Engineer, Jan. 1999; XP-000799176; pp. 33-38.*
Kochanski, Ulrich, et al.; "Overview of Uhde Heat Recovery Cokemaking Technology"; AISTech. Iron and Steel TechnologyConference Proceedings, Association for Iron and Steel Technology, U.S.; May 2005; pp. 25-32; vol. 1; XP008068124.

* cited by examiner

*Primary Examiner* — Jill Warden
*Assistant Examiner* — Joye L Woodard
(74) *Attorney, Agent, or Firm* — Marshall & Melhorn, LLC

(57) ABSTRACT

This invention relates to a coking oven in flat-type construction, a non-recovery or heat-recovery coking oven, which has at least one measuring apparatus for measuring the concentration of gaseous constituents of the coke oven retort, the coke oven hearth and/or the off gas duct, and in which, on the basis of these data, a process control computer determines and regulates the optimal supply of primary and/or secondary air. Also embraced by the invention is a coking method employing a coking oven of this kind.

9 Claims, 1 Drawing Sheet

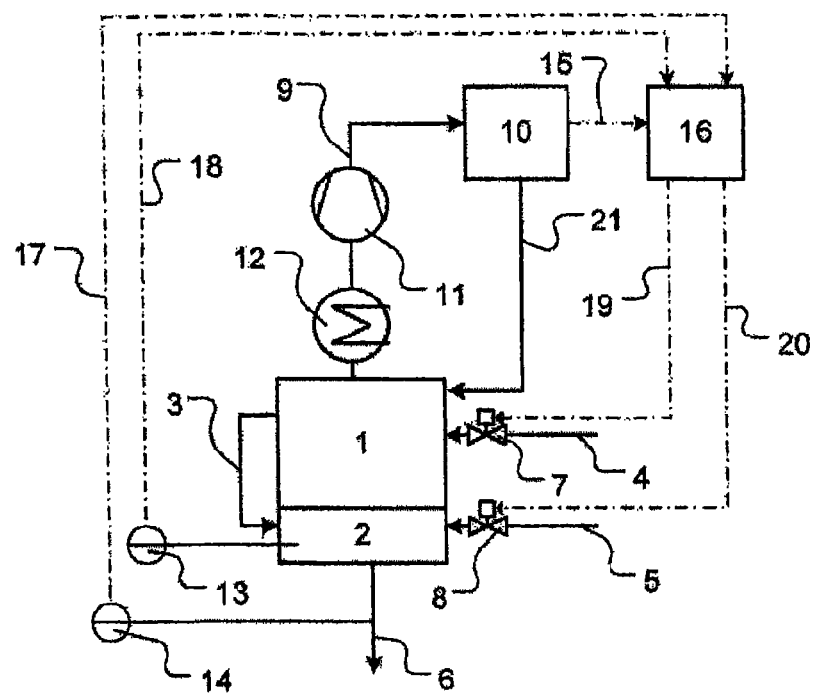

COKE OVEN WITH OPTIMIZED CONTROL AND METHOD OF CONTROL

BACKGROUND OF THE INVENTION

This invention relates to a coke oven built in flat-type construction, i.e. a so-called non-recovery or heat-recovery coke oven consisting of at least one measuring device to measure the concentration of gas constituents in the coke oven chamber, coke oven sole and/or waste gas channel, and wherein the optimal supply of primary and/or secondary air is determined and controlled via a process computer on the basis of this data. This invention also covers a cokemaking process utilizing a coke oven of this type.

Heating of heat-recovery ovens is usually performed by combustion of gas evolving on cokemaking and/or by burning the portions of light-volatile matter of coal to be carbonized. Combustion is controlled in such a manner that part of the gas above the coal charge burns off with primary air in the oven chamber. This partly burnt gas is fed through gas channels that are also designated as "downcomers" to the oven sole and completely burnt there by the addition of further combustion air, which is called secondary air.

In this way, heat is directly supplied from the top and indirectly from the bottom to the coal charge, thus taking a positive impact on the coking rate and, thereby, on the performance rate of coke ovens. To execute the method it is required to exactly rate and variably control the supplied primary and secondary air throughout the coking time that may take up to 96 hours. Heat-recovery and non-recovery coke ovens in flat-type construction are widely described in prior art disclosures. For example, reference is taken to U.S. Pat. No. 4,344,820, U.S. Pat. No. 4,287,024, U.S. Pat. No. 5,114,542, GB 1 555 400 or CA 2 052 177 C.

According to the conventional state of the art in technology, primary air is sucked in from the atmosphere through ports in the doors. Secondary air is sucked in through ports near to ground and conducted through channels into the heating flues which mainly extend horizontally under the coke oven chamber. The ports for primary and secondary air are either opened permanently or provided with flaps designed to adjust the amount of air to be aspirated.

As the coke oven batteries are very extensive, and since usually a very high temperature prevails therein and because a serious development of dust is encountered, only manually adjustable venting flaps are disclosed in prior art technology. U.S. Pat. No. 5,928,476 describes such a coke oven battery, wherein three manually operable ports are provided in each coke oven door, in which or in front of which one plate or disk each adapted to the port cross-section and supported at a central axle is arranged. These port flaps can be varied in their position manually through levers.

The German patent DE102005055483.0-24 of the applicant discloses a central adjusting element that permits a continuous control of primary and secondary air.

In practice, however, it became evident that varying coal qualities due to different coal crushing degrees, coal moisture or inert portions, etc. were difficult to master with prior art coke ovens and that unnecessarily long coking times had to be planned to attain high coke quality.

BRIEF SUMMARY OF THE INVENTION

Now, therefore, it is the object of this invention to remedy the described deficiencies in an economic manner and to assure an optimized supply of primary air and/or secondary air in order to improve coke oven performance rate and, thereby, coking time, too.

This invention solves this task by providing a coke oven built in flat-type construction, i.e. a so-called non-recovery or heat-recovery coke oven consisting of a coke oven chamber and a coke oven sole consisting of channels, with the coke oven chamber and the coke oven sole being connected to each other via gas channels, and wherein opening ports for the supply of primary air and one or more opening port(s) or channel(s) for the supply of secondary air into the coke oven sole are provided in the oven wall or in the oven door, and wherein shutoff devices are arranged in front of the opening ports or in the lines conducing to these opening ports.

Accordingly, at least one measuring device to measure the concentration of gas constituents in the coke oven chamber, is connected to the coke oven chamber, and the at least one measuring device is linked via a channel to the coke oven chamber, and the at least one measuring device in turn is linked to a computer unit in such a way that this computer unit can receive data and measured results from the measuring device, and the computer unit is connected via control lines to one or more adjusting device(s) of the shutoff devices, with said shutoff devices representing valves, flaps, slide gates, or the like.

An improved variant resides in arranging a temperature measuring device in the coke oven sole or in the waste gas channel of the coke oven, wherein said temperature measuring device is also connected to the computer unit in such a way that it can receive data and measuring results from the temperature measuring device.

The measuring devices ideally represent analysers to measure hydrogen, nitrogen, carbon monoxide or carbon dioxide, said measuring devices being connected via a line to the coke oven chamber. The concentration of these main constituents or of one of these main constituents correlates very well with the coking state of the coke cake.

Above all it is hydrogen burning off as the last coal constituent that is an ideal indicator to indicate the end of coking time. Hence, with the coke oven embodying this invention, it is possible to control the cokemaking process in such a manner that the end of the coking time is achieved, in a way, concurrently to achieving 0% by vol. of $H_2$. For if $H_2$ has burnt off prematurely, this leads to an increased combustion and/or incineration of coke valuables which represents an economic drawback.

In another variant of this invention, the measuring device is a lambda probe arranged in the coke oven sole or in the waste gas channel to determine the content of oxygen. By means of the lambda probe, and by a feedback with the control of secondary air, it can be assured that a complete combustion will always occur in the coke oven sole without too drastic a drop in temperature which would lead to a prolongation in coking time.

With an advanced variant of this invention, at least one analyzer for the determination of hydrogen, nitrogen, carbon monoxide or carbon dioxide as well as a lambda probe for the determination of oxygen are provided for.

Furthermore, this invention covers a method for coal carbonization in which the afore-mentioned coke oven is implemented in one of the disclosed embodiments, wherein the oven is charged with coal and wherein the cokemaking process is started, the concentration of one or more gas constituent(s) is analyzed during carbonization, this data are transmitted to a computer unit, this computer unit determines the supply of primary and/or secondary air on the basis of stored discrete values or model computations, and this computer unit activates the control elements of the shutoff devices for primary and/or secondary air via control lines, and thus it regulates the primary and/or secondary air.

In an improved variant of this method, the temperature in the coke oven sole and/or waste gas channel is determined, and this data is transmitted to a computer unit, and subsequently this computer unit determines the supply of primary and/or secondary air on the basis of stored discrete values or model computations, and the control elements of the shutoff devices for primary and/or secondary air are controlled via control lines, and thus the primary and/or secondary air is controlled and regulated during coal carbonization.

The method embodying this invention is applied in such a manner that during coal carbonization the mean temperature in the coke oven sole falls by 350° C. to 400° C. and does not fall under 1000° C. Furthermore, an optimization resides in controlling and regulating the oxygen concentration in the waste gas channel at a constant level within a range of 7.5 to 8.5 percent by volume.

BRIEF DESCRIPTION OF THE DRAWINGS

In the accompanying drawing:
The FIGURE shows a coke oven according to the present invention.

DETAILED DESCRIPTION OF THE INVENTION

The invention is described by taking an example based upon the variant of the embodiment shown in the FIGURE, with the invention not being restricted to the example of this embodiment. The FIGURE illustrates a coke oven consisting of a coke oven chamber 1 and a coke oven sole 2, wherein the individual chambers or channels of the coke oven sole 2 are not illustrated. Via gas channel 3 the coke oven chamber 1 is connected to the coke oven sole 2. Primary air can be supplied through line 4 into the coke oven chamber 1, with a control flap 7 being arranged in the line 4. Secondary air can be supplied through line 5 into the coke oven sole 2, with a control flap 8 being arranged in the line 5. Line 9 serves for taking a small gas volume stream from coke oven chamber 1 and connects coke oven chamber 1 with an analyser 10 which in the illustrated example is suitable for $H_2$ measurement. The gas to be measured and conveyed in a channel 9 is aspirated by means of compressor 11 and conveyed to the analyser 10. A heat exchanger 12 is installed upstream to compressor 11 to cool the gas. Via line 21, the gas volume stream is passed back into the coke oven chamber 1.

Furthermore, the temperature measuring device 13 arranged in the coke oven sole 2 and the lambda probe 14 arranged in the waste gas channel 6 are schematically illustrated. Via the data buses 17 and 18, the measured values are transmitted to the computer unit 16 which also receives the measured values from the analyser 10 via data bus 15. Via control lines 19, the computer unit 16 controls the control flap 7 and thus regulates the volume stream of primary air and, respectively, the temperature in the coke oven chamber 1.

Furthermore, the computer unit 16 controls the control flap 8 via the control line 20, thereby regulating the volume stream of secondary air and, thus, the temperature in the coke oven sole 2 as well as the content of oxygen in the waste gas channel 6.

By applying the method described hereinabove and the device embodying this invention, it was managed to reduce the coking time substantially. Now it is possible to reliably achieve a coking time of less than 48 hours, which represents a remarkable increase in oven performance rate as compared with the state of the art in technology.

LIST OF REFERENCE NUMBERS

1 Coke oven chamber
2 Coke oven sole
3 Gas channel
4 Line (primary air)
5 Line (secondary air)
6 Waste gas channel
7 Shutoff element (primary air)
8 Shutoff element (secondary air)
9 Line
10 Analyzer
11 Compressor
12 Heat exchanger
13 Temperature measuring instrument
14 Lambda detector
15 Data bus
16 Computer unit
17 Data bus
18 Data bus
19 Data bus
20 Data bus
21 Back pass line for gas stream

The invention claimed is:

1. A method for coal carbonization, utilizing a coke oven, the coke oven comprising:
   a coke oven chamber (1);
   a coke oven door with a surrounding coke oven wall; and
   a coke oven sole (2) with channels (3); wherein
   the coke oven chamber (1) and coke oven sole (2) are connected via gas channels (3), and shutoff devices (7,8) in front of the opening ports (4,5) for primary and secondary air are implemented, the method comprising:
   charging the oven chamber (1) with coal and starting the coke making process;
   analyzing (10) the concentration of one or more gas constituents (10) during the coke making process in the coke oven chamber (1) by a measuring device (10) for the determination of hydrogen, nitrogen, carbon monoxide or carbon dioxide;
   transmitting (15) the data to a computer unit (16);
   determining the supply of primary and/or secondary air (4,5) with the computer unit (16) on the basis of stored discrete values or model computations; and
   actuating the control elements of the shutoff devices (7,8) for primary and/or secondary air according to the determination of the computer unit (16) via control lines (19,20), so that the admittance of primary and/or secondary air (4,5) is regulated by the control elements of said shutoff devices (7,8).

2. The method for coal carbonization according to claim 1, further comprising:
   measuring the temperature (13) in the coke oven sole (2) and/or waste gas channel (6),
   transmitting (18) the resulting data to a computer unit (16), wherein the computer unit (16):
  determines the supply of primary and/or secondary air (4,5) on the basis of stored discrete values or model computations, and
  activates the control elements of the shutoff devices (7,8) for primary (4) and/or secondary (5) air via control lines (19,20), thus
  regulating the admittance of primary and/or secondary air (4,5) during the coke making process.

3. The method for coal carbonization according to claim 1, wherein the mean temperature in the coke oven sole (2) during the coke making process drops within a range of 350° C. to 400° C. and does not fall under 1000° C.

4. The method for coal carbonization according to claim 1, wherein the concentration of oxygen in the waste gas channel (6) constantly lies in the range of 7.5 to 8.5 percent by volume.

5. A coke oven built in flat-type construction, which is a non-recovery and/or heat recovery coke oven, the coke oven comprising:
  a coke oven chamber (1), which chamber contains at least one front side coke oven door with a surrounding coke oven wall,
  a coke oven sole (2) comprising channels,
  gas channels (3), the gas channels (3) being disposed to connect the coke oven chamber (1) and the coke oven sole (2),
  one or several opening ports (4) or channels for supplying primary air are disposed through the coke oven wall or coke oven door,
  one or several opening ports (5) or channels for supplying secondary air into the coke oven sole (2) are disposed in the oven wall and/or oven door and/or oven sole, and
  shutoff devices (7,8) are arranged in front of these opening ports (4,5) or in lines conducting to these opening ports, wherein:
    the coke oven chamber (1) is connected with at least one measuring device (10) to measure the concentration of gas constituents of the coke oven chamber (1), and
    the at least one measuring device (10) is linked via a channel (9) to the coke oven chamber (1), and
    the at least one measuring device (10) is linked to a computer unit (16) in such a way (15) that this computer unit (16) can receive data and measured results from the measuring device (10), and
    the computer unit (16) is connected via control lines (19, 20) to one or more adjusting devices of said shutoff devices (7,8), with the shutoff devices (7,8) representing valves, flaps, slide gates or the like.

6. The coke oven according to claim 5, wherein a temperature measuring device (13) is arranged in the coke oven sole (2) or in the waste gas channel (6), wherein said temperature measuring device (13) is also connected to the computer unit (16) in such a way that it can receive data and measured results from the temperature measuring device (13).

7. The coke oven according to claim 5, wherein the measuring device is an analyzer (10) for the determination of hydrogen, nitrogen, carbon monoxide or carbon dioxide.

8. The coke oven according to claim 5, wherein a lambda detector (14) for measuring or detecting the oxygen content is arranged in the coke oven sole (2) or in the waste gas channel (6).

9. The coke oven according to claim 5, wherein the measuring device comprises a further detector which is a lambda detector (14) for the determination of oxygen.

* * * * *

UNITED STATES PATENT AND TRADEMARK OFFICE
CERTIFICATE OF CORRECTION

PATENT NO.         : 8,465,626 B2                                       Page 1 of 1
APPLICATION NO.  : 12/087209
DATED              : June 18, 2013
INVENTOR(S)        : Schuecker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this
Eighth Day of September, 2015

Michelle K. Lee
*Director of the United States Patent and Trademark Office*